Aug. 9, 1932.     C. WINNING     1,870,884
GAUGE DEVICE
Filed July 17, 1930
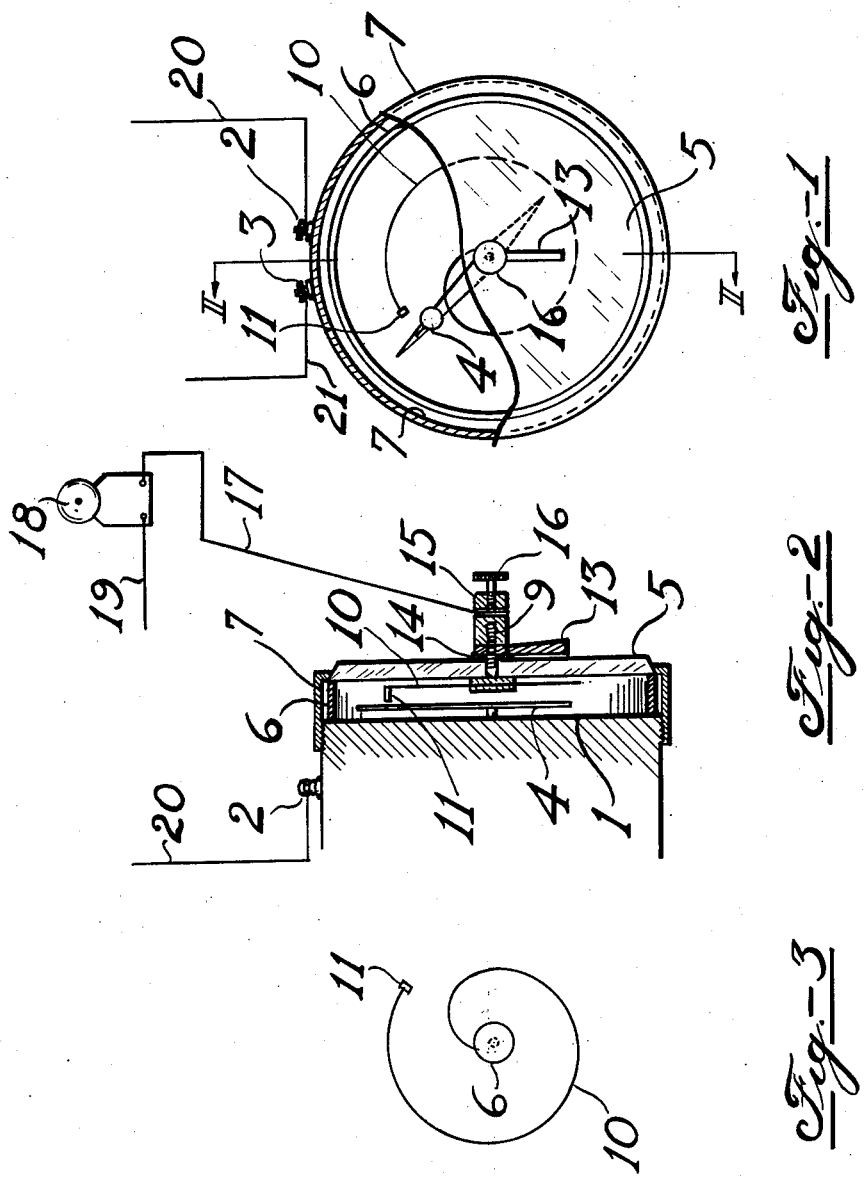

Patented Aug. 9, 1932

1,870,884

UNITED STATES PATENT OFFICE

CARL WINNING, OF ELIZABETH, NEW JERSEY, ASSIGNOR TO STANDARD OIL DEVELOPMENT COMPANY, A CORPORATION OF DELAWARE

GAUGE DEVICE

Application filed July 17, 1930. Serial No. 468,685.

This invention relates to improvements in gauges. The invention will be fully understood from the following description taken in connection with the accompanying drawing in which latter Fig. 1 is a front elevation of the gauge;

Fig. 2 is a transverse sectional view taken along the line II—II of Fig. 1; and

Fig. 3 is a rear elevation of the contact member.

Referring particularly to the drawing, reference numeral 1 designates the body portion of a circular gauge device. The body portion is provided with electrically conductive binding posts 2 and 3. An electrically conductive pointer 4 is associated with the body portion and is adapted to be moved pivotally by a source of power operative through pressure, change of temperature, or the like. The pointer 4 has electrically conductive communication with binding post 2 through the body portion 1 or, if desired, by any suitable connecting means. Binding post 3 is electrically insulated from the body portion. A gauge glass 5 is secured to the body portion in spaced relation to the pointer 4 by means of a separator ring 6 and a coupling sleeve 7. The gauge glass constitutes an electrically non-conductive supporting means for an electrically conductive contact member.

The contact member comprises a threaded bolt 9 of electrically conductive material, the shank of which extends through the gauge glass and the head of which carries a spiral resilient portion 10 formed of phosphor bronze wire, iron wire, or other resilient electrically conductive material. The resilient portion is preferably provided with a rugged contact member 11 adjacent its free end projecting into the path of the pointer. It will be understood that under certain conditions the rugged contact member can be omitted and the free end of the contact member can be bent laterally to provide a surface to be engaged by the pointer. The contact member is adjustable rotatably with respect to the gauge glass and can be secured in adjusted position by means of the handle 13 and lock washer 14. A binding post 15 has screw threaded engagement with the shank of bolt 9 and is provided with a set screw 16 to secure a wire 17 through which an electric current can be passed. Wire 17 communicates with any suitable alarm device 18 such as a bell. The alarm device communicates through a wire 19 with binding post 3. Binding posts 2 and 3 communicate through wires 20 and 21 respectively with a source of electric energy, not shown.

In utilizing the device, the contact member is disposed in adjusted position so as to be contacted by the pointer of the gauge when a predetermined amount of rotation of the pointer has been effected due to pressure, temperature, or any other condition for which the gauge is to constitute the registering medium. The contact member yields under pressure of the gauge sufficiently so that the pointer will not be bent or otherwise forced out of adjustment. Contact of the pointer with the contact device closes an electric circuit through the gauge device and alarm device and thereby actuates the alarm device to give the signal characteristic of the particular alarm device used. It will be understood that a relay, not shown, can be placed in the circuit and the device can be used to serve as a constant pressure or constant temperature regulator or the like.

Various changes may be made within the scope of the appended claims, in which it is desired to claim all novelty inherent in the invention as broadly as the prior art permits.

I claim:

1. A contact member for a gauge device, comprising a supporting means and a wire of resilient material in the form of a spiral carried at one end by the supporting means having its free end adapted to be engaged by the pointer of the gauge device.

2. A contact member for a gauge device, comprising a supporting means of electrically conductive material, and an electrically conductive wire of resilient material in the form of a spiral carried at one end by the supporting means and having its free end adapted to be engaged by the pointer of the gauge device.

3. A contact member for a gauge device, comprising a supporting means and a wire of resilient material in the form of a spiral carried at one end of the supporting means and having a free end, the wire having a laterally projecting portion adjacent its free end adapted to be engaged by the pointer of the gauge device.

4. In a gauge device, a body portion, an electrically conductive pointer associated with the body portion and adapted to be moved pivotally by a source of power, an electrically non-conductive supporting means associated with the body portion, and an electrically conductive contact member of resilient material in the form of a spiral carried by the supporting means substantially parallel with the plane of the pointer and terminating in a portion positioned to be contacted by the pointer.

CARL WINNING.